(No Model.)
W. C. HOMAN.
LAMP BRACKET.
No. 577,429. Patented Feb. 23, 1897.
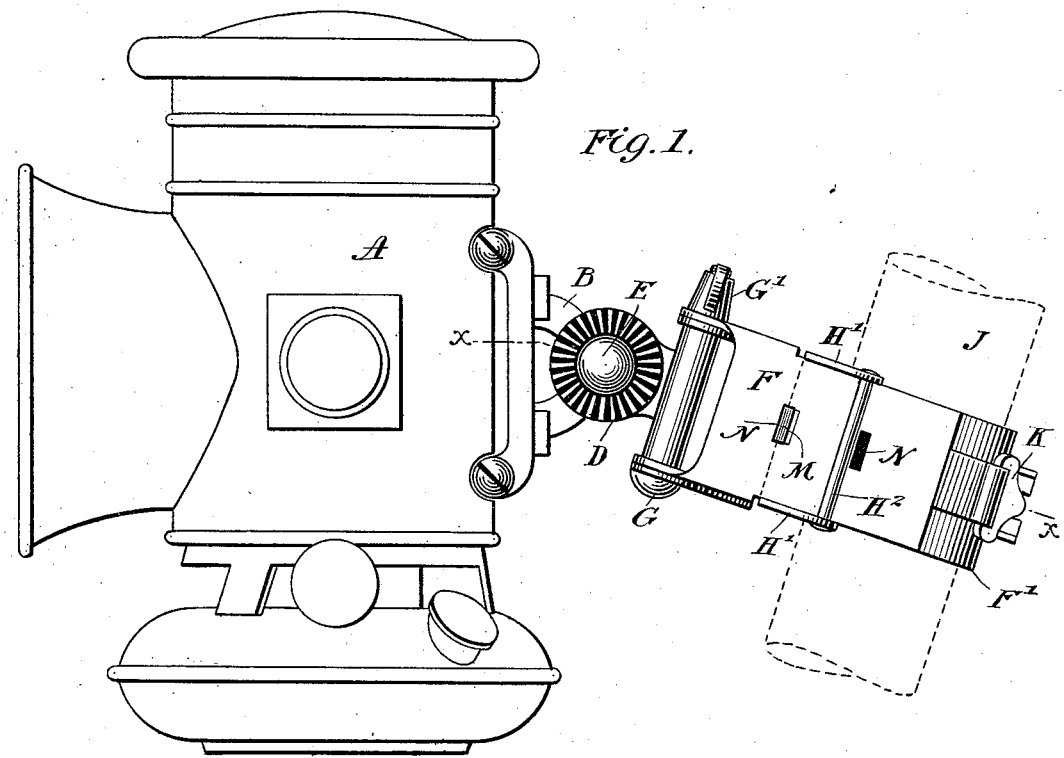
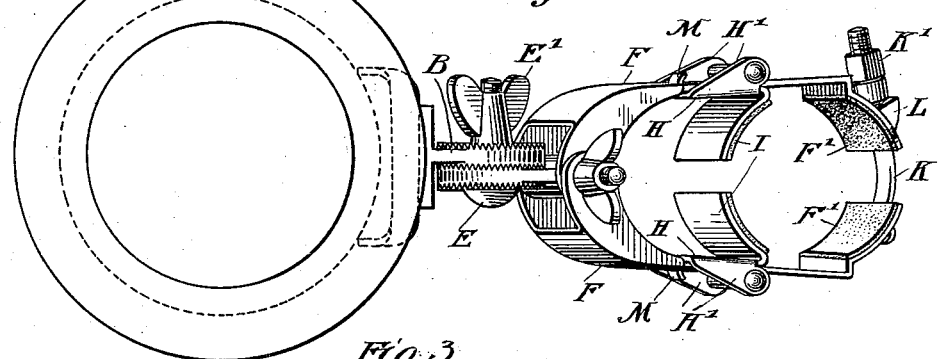
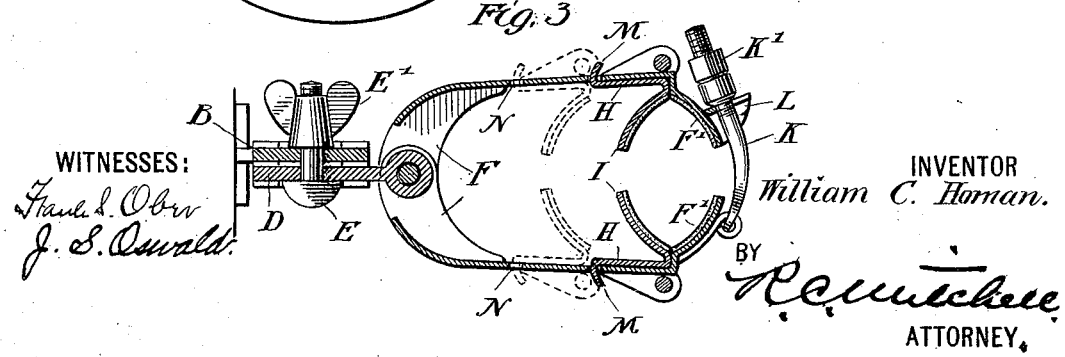
WITNESSES:
Frank S. Ober
J. S. Oswald
INVENTOR
William C. Homan.
BY
R. C. Mitchell
ATTORNEY.

UNITED STATES PATENT OFFICE.

WILLIAM C. HOMAN, OF MERIDEN, CONNECTICUT, ASSIGNOR TO THE EDWARD MILLER & COMPANY, OF SAME PLACE.

LAMP-BRACKET.

SPECIFICATION forming part of Letters Patent No. 577,429, dated February 23, 1897.

Application filed December 21, 1896. Serial No. 616,410. (No model.)

*To all whom it may concern:*

Be it known that I, WILLIAM C. HOMAN, a citizen of the United States, residing at Meriden, in the county of New Haven and State of Connecticut, have invented certain new and useful Improvements in Lamp-Brackets, of which the following is a full, clear, and exact specification.

My invention relates to improvements in lamp-brackets; and it consists in the construction and arrangement of parts thereof hereinafter fully described.

The object of my invention is to provide a means whereby a lamp may be held in firm engagement with the frame of a bicycle or other vehicle, the said bracket being provided with clamping members and supplemental parts therefor whereby said clamping members may have the universal capacity of being adapted to variously-formed parts of the frame.

My invention is illustrated by the accompanying drawings, in which—

Figure 1 is a side elevation of my device in one of its operative positions. Fig. 2 is a plan view of the parts shown in Fig. 1; and Fig. 3 is a longitudinal section through substantially the center of the said lamp-bracket, the arrangement of certain parts thereof being shown in a different position from that indicated in Figs. 1 and 2.

Similar letters refer to similar parts.

A is a lamp. B is a rearward projection therefrom affording a means for connecting the same to an intermediate supporting member D. The faces of the parts B D are by preference knurled or roughened, as shown, so that by means of a bolt E and adjusting-nut E' the said parts B D may be held in firm engagement with one another. The intermediate member D is by preference pivotally connected to the clamping members F F by means of a bolt G. G' is a set-nut therefor. The free extremities of the clamping members F F are turned inward, as at F' F'.

H H are adjustable clips operating interiorly of the main clamping-arms F F. These clips H H comprise wings I, projecting inwardly from said clamping members F, and complement the ends F' F' of the clamping-arms F. A suitable portion of the frame of the vehicle, such as J, Fig. 1, is engaged by the wings I and the ends F' of the clamps F when the parts are in their operative position, as shown in said Fig. 1.

K is a latch secured to one of the clamping-arms F, said latch carrying an adjusting-nut K', which, when the parts are in the operative position, engages to the rear of a shouldered abutment L upon the other arm F of the clamping member. Obviously any well-known means may be provided in place of the latch K for drawing the clamping-arms F F toward each other.

M is a tongue formed on each of the clips H, the said tongues being adapted to enter recesses or perforations N in the sides of the clamping-arms F. By preference a number of these perforations N are provided in each arm F, so that by tilting the clips H sufficiently to withdraw the tongues M from said recesses or perforations the wings I may be set at the desired distance from the clamping ends F' of the arms F.

In Fig. 1 the parts are arranged so as to clasp a substantially cylindrical body, while in Fig. 3 the wings I I are shifted into a position suitable to engage a somewhat flattened or angular body, such as, for instance, a fork-blade of a bicycle.

To prevent the wings I from tipping inwardly or becoming accidentally disengaged, I have shown a means comprising ears H' formed integrally with the clips H and overlapping the opposite edges of the clamping-arms F F. I have also shown a connection $H^2$ between each set of ears H', said connection lying along the outer surface of the arms F. Obviously this means for preventing the wings I tipping out of the operative position may be varied as desired.

Having thus described my invention, what I claim, and desire to secure by Letters Patent, is—

1. In a lamp-bracket for bicycles and other vehicles, main clamping-arms, adjustable clips carrying clamping-wings and mounted upon and between said main clamping-arms.

2. In a lamp-bracket for bicycles and other vehicles, main clamping-arms, longitudinally-movable clips carrying clamping-wings and mounted upon and between said main clamping-arms.

3. In a lamp-bracket for bicycles and other vehicles, main clamping-arms, recessed or perforated as described, adjustable clips carrying inwardly-projecting clamping-wings, tongues carried by said clips and adapted to engage in said recesses or perforations.

4. In a lamp-bracket for bicycles and other vehicles, main clamping-arms pivotally connected at one end, the free ends being curved inwardly for the purpose described, adjustable clips mounted upon said arms intermediate in their length and means for adjusting the position of said clips, substantially as described.

5. In a lamp-bracket for bicycles and other vehicles, main clamping-arms pivotally connected at one end, the free ends of said arms being curved inwardly for the purpose described, adjustably-mounted clips carried by said arms and adapted to slide on said arms, means for adjusting the position of said clips thereon as described, and a universal connection between the body of the lamp to be supported and the pivoted ends of the clamping-arms.

WILLIAM C. HOMAN.

Witnesses:
H. O. WINSLOW,
CHAS. E. HOMAN.